(12) United States Patent
Watanabe et al.

(10) Patent No.: US 11,720,689 B2
(45) Date of Patent: Aug. 8, 2023

(54) DATA REGISTRATION METHOD, DATA DECRYPTION METHOD, DATA STRUCTURE, COMPUTER, AND PROGRAM

(71) Applicant: Nippon Telegraph and Telephone Corporation, Tokyo (JP)

(72) Inventors: Hiroki Watanabe, Yokosuka (JP);
Shigenori Ohashi, Yokosuka (JP);
Shigeru Fujimura, Yokosuka (JP);
Atsushi Nakadaira, Yokosuka (JP);
Satoshi Sakuma, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 457 days.

(21) Appl. No.: 16/757,736

(22) PCT Filed: Jun. 27, 2018

(86) PCT No.: PCT/JP2018/024401
§ 371 (c)(1),
(2) Date: Apr. 20, 2020

(87) PCT Pub. No.: WO2019/082442
PCT Pub. Date: May 2, 2019

(65) Prior Publication Data
US 2021/0192059 A1    Jun. 24, 2021

(30) Foreign Application Priority Data
Oct. 27, 2017    (JP) .................................. 2017-208384

(51) Int. Cl.
*H04L 29/06*    (2006.01)
*G06F 21/60*    (2013.01)
(Continued)

(52) U.S. Cl.
CPC ............ *G06F 21/602* (2013.01); *G06F 16/27* (2019.01); *H04L 9/0861* (2013.01); *H04L 9/30* (2013.01); *H04L 9/50* (2022.05)

(58) Field of Classification Search
CPC ..... G06F 21/602; G06F 16/27; H04L 9/0861; H04L 9/30; H04L 9/50; H04L 9/0825;
(Continued)

(56) References Cited

U.S. PATENT DOCUMENTS

2007/0130627 A1    6/2007  Yoshioka
2016/0350749 A1*   12/2016 Wilkins ............... G06Q 20/401
(Continued)

FOREIGN PATENT DOCUMENTS

JP    2007-156970 A    6/2007
JP    2008-077235 A    4/2008
(Continued)

OTHER PUBLICATIONS

IBM Corporation, "Blockchain for beginners", [Online], Sep. 15, 2016, [retrieved on Oct. 3, 2017], Internet (URL: https://www.ibm.com/developerworks/jp/cloud/library/j_cl-blockchain-basics-bluemix/index.html).
(Continued)

*Primary Examiner* — Joseph P Hirl
*Assistant Examiner* — Leynna Truvan
(74) *Attorney, Agent, or Firm* — Kilpatrick Townsend & Stockton, LLP

(57) ABSTRACT

An objective is to manage contract data registered in a distributed ledger with part of the contract data flexibly concealed without a centralized concealment server and without bothering the user with complicated procedures or the key management. A data registration method performed by a computer includes: generating a common key for encrypting and decrypting an item included in data that is
(Continued)

registered in a distributed ledger; acquiring a public key for each account of a user having access authority to the item; encrypting the common key with the public key for each account; and registering the common key encrypted for each account in the distributed ledger via a transaction.

6 Claims, 11 Drawing Sheets

(51) Int. Cl.
  *G06F 16/27* (2019.01)
  *H04L 9/08* (2006.01)
  *H04L 9/30* (2006.01)
  *H04L 9/00* (2022.01)
(58) Field of Classification Search
  CPC . H04L 63/062; H04L 2209/56; H04L 9/3239; G06Q 20/3829
  See application file for complete search history.

(56) References Cited

U.S. PATENT DOCUMENTS

2017/0177898 A1* 6/2017 Dillenberger ....... G06F 21/6227
2018/0241551 A1  8/2018 Fujimura et al.

FOREIGN PATENT DOCUMENTS

| | | | |
|---|---|---|---|
| JP | 2017-050763 | A | 3/2017 |
| JP | 2017-098806 | A | 6/2017 |
| JP | 2017-195627 | A | 10/2017 |
| JP | 2017195627 | A  * | 10/2017 |
| WO | 2017-090041 | A1 | 6/2017 |

OTHER PUBLICATIONS

Fujitsu Laboratories Ltd., "Development of Security Reinforcement Technology for Blockchain", 2. Document Encryption Technology on Blockchain through Secret Sharing-based Key Management, [Online], Oct. 19, 2016, [retrieved on Oct. 3, 2017], Internet (URL: http://pr.fujitsu.com/jp/news/2016/10/19.html).
International Search Report, PCT Patent Application No. PCT/JP2018/024401, dated Sep. 18, 2018.
Written Opinion, PCT Patent Application No. PCT/JP2018/024401, dated Sep. 18, 2018.
International Preliminary Report on Patentability, PCT Patent Application No. PCT/JP2018/024401, dated May 7, 2020, 7 pages.
Yoshihama et al., "Protection of Integrity and Privacy on Distributed Ledger Technologies", Information Processing Society of Japan, Computer Security Symposium, Oct. 23-25, 2017, 8 pages.

* cited by examiner

FIG. 2A contract1: {
   date : "2017.07.20",
   description : "Contract with ABC"
   contractors : ["X Bank", "S Company"],
   amount : { code: "JPY", value: 160000 },
   charges: 100,
   status: "ACTIVE"
},
contract2: {
   date : "2017.07.21",
   description : "Contract with DEF"
   contractors : ["Y Bank", "T Company"],
   amount : { code:"JPY",value: 230000 },
   charges: 200,
   status: "PENDING"
},
contract3: {
   ....
},...

FIG. 2B

```
contract1: {
         date : "2017.07.20",
         description : "Contract with ABC"
         contractors : "9efe65dfcb46dd8...",
R21 ─┤   amount : "f613eae6a3d305a28...",
         charges: "205c88646e83a180...",
         status: "ACTIVE"
},
contract2: {
         date : "2017.07.21",
         description : "Contract with DEF"
         contractors : "d8c105f8dc36173...",
R22 ─┤   amount : "91f742233eb60af2c...",
         charges: "be352cfe70bacc7b3...",
         status: "PENDING"
},
contract3: {
         ....
},...
```

FIG. 4

```
org1.userA: {
        publicKey: "MIIBIjANBgkqhkiG9w0BAQEFAAOCAQ8AMIIBCgKCAQEAlmDbSi2dMaut1oeAF1kx...",   ← R41
        decryptKeys: {
                        contract1.contractors: "QJnWb2TCpKA4C2Ad2s3737n1Waw5hlSejanVWc...",
            R42 ─       contract2.contractors: "T2VM6nnwa0d8in+Op8HoKzEx2ldGps8Pr5fd...",
                        contract1.amount:      "XnyHCFirkSeJ6mEgTrpTB6RewKbd84xe7d5SZ3uA6H...",
                        contract2.amount:      "FkadETAiNcVUkH91dhMEbuoUa3WDkkBjXlmZuWKc..."
        },
        identity: "NvAoWAuwLMgnK..."
},
org1.userB: {
        publicKey: "MIIBIjANBgkqhkiG9w0BAQEFAAOCAQ8AMIIBCgKCAQEArRMiTXF2i5JvrvOANVU7...",
        decryptKeys: {
                        contract1.contractors: "ShU6XcwE/b3opMaMwpBZjGQlexz2vrwflRSmTzwl07U...",
                        contract2.contractors: "MllOX+d/ocN4ws2JuZui9VD3OoFCtwkGAu8DAPerk/D2...",
                        contract1.amount:      "KPT1+ENNF7MEEq7UAQ9Woz8hCrdmpZxFU7OccwlaYD...",
                        contract2.amount:      "Oo5TCQZQfpvL+/MkqJTeYgTKeOr+MST4WucSVjeCfH..."
        },
        identity: "pE8KwGhoVTHN7..."  ← R44             R43
},
org2.userX: {
        publicKey: "MIIBIjANBgkqhkiG9w0BAQEFAAOCAQ8AMIIBCgKCAQEAvCXjeQB/thB4dafXM6A8...".
        decryptKeys: {
                        contract1.contractors: "J+n9943BEtaZx/qY6dz2nnaYvuhfyO6U6sHFvCVmR4vkhLuS..."
                        contract2.contractors: "GEDRcHDKulbilBnGBFPu19yc+iLfpW5QyrRlGyPN/fg5TAZeu...",
                        contract1. amount: "HgA0IGqxsT7InB4EoR3Mtrw4CrXIkSSBKYm6EcpBjDL7ddQA+g...",
                        contract2. amount: "PPFbpIFbaDjKgFHkt5jOq4RpRx5SSV1J3QkjDBNrkVYRJ9Gr/e...",
        },
        identity: " HNIAGUqNU1GA..."
},
org3.userS: {
        publicKey: "MIIBIjANBgkqhkiG9w0BAQEFAAOCAQ8AMIIBCgKCAQEA56mBk1ZVORHcOAdPsQ2i...".
        decryptKeys: {
                        contract1.contractors: "FwzGMXG4RGGidAgpo4oHmw5l4x9i+elG3TmwrBoKxQsHRBF5..."
                        contract2.contractors: "oaeH33pZqxOW8ojnwV7or9YOAas8iMmJs25bit+ymHEYu1UN/..."
                        contract1. amount: "JAqSU1jt7yVbX7M9psLLCKuZ6j73V9bUFNGusKSsCTxv4C2fV8...",
                        contract2. amount: "M7yUmUeCig/1fMD0NjQ2S+e8UsL1JxoxBeiL3tJuNwXUi/a7kHEny..."
        },
        identity: " x2LOK4h9ia6s/K..."
}...
```

DATA REGISTRATION METHOD, DATA DECRYPTION METHOD, DATA STRUCTURE, COMPUTER, AND PROGRAM

TECHNICAL FIELD

The present invention relates to data registration methods, data decryption methods, data structures, computers, and programs.

BACKGROUND ART

Through the years, a mechanism that ensures the reliability without requiring centralized management has been getting popular, in particular, in a field of bitcoin which is cryptocurrency. This mechanism called blockchain ensures the reliability of exchanged information through a consensus building process within a distributed network. Its soundness is maintained by preventing frauds, such as tampering or double-spending, in the entire system. In this blockchain, cryptocurrency transaction information (transaction) between participants is organized into a unit called "block", and blocks are linked in the form of a chain and managed in chronological order. A new block is approved through a consensus algorithm such as Proof of Work in a distributed network. This means that the currency transaction recorded inside a block has been consented in the entire system. The ledger of a series of transaction information pieces managed using this blockchain is called the "distributed ledger". Nodes participating in a network have the same distributed ledger.

Nowadays, blockchain platform technologies are also developed in which advanced script code is registered in the distributed ledger in addition to currency transactions and in which the execution and results of the script code are also subjected to consensus. For example, in a blockchain platform typified by Ethereum or Hyperledger Fabric, script code is executed using each transaction as input, the execution result is stored in a key-value store, a representative value of the store at the time is also recorded in the block in the distributed ledger (for example, non-patent document 1). In cryptocurrency described above, the content of a transaction is limited to a currency transaction record such as "who passed how much to whom". In contrast, in these succeeding blockchain technologies, the user himself/herself can programmably set information to be recorded by using a transaction and script code. This makes it easy to apply blockchain to various applications other than currency transactions, such as securities exchange, insurance business, and copyright management. These platform technologies are called smart contract blockchain because a contract is subjected to consensus among participants.

PRIOR ART DOCUMENT

Patent Document

Patent document 1: Japanese Patent Application Publication No. 2017-50763

Non-Patent Document

Non-patent document 1: IBM Corporation, "Blockchain for beginners", [Online], Sep. 15, 2016, [retrieved on Oct. 3, 2017], Internet (URL: https://www.ibm.com/developerworks/jp/cloud/library/j_cl-blockchain-basics-bluemix/index.html)

Non-patent document 2: FUJITSU LABORATORIES LTD., "Development of Security Reinforcement Technology for Blockchain", 2. Document Encryption Technology on Blockchain through Secret Sharing-based Key Management, [Online], Oct. 19, 2016, [retrieved on Oct. 3, 2017], Internet (URL: http://pr.fujitsu.com/jp/news/2016/10/19.html)

SUMMARY OF THE INVENTION

Problem to be Solved by the Invention

The above blockchain systems are based on the assumption that information is disclosed among all the nodes. However, there are cases, depending on the application, where it is desirable to conceal some areas of transactions and disclose the concealed areas only to participants involved. For example, according to the method disclosed in patent document 1, which is applied to the license management of contents, encrypted information can be communicated via a blockchain of a cryptocurrency type. In this method, target data to be encrypted is a common key for a content, and concealed information is exchanged only between the terminals of two parties, a right holder and a user. However, in this method, it is impossible to select an area to be concealed.

For the case where the user can programmably set the items of a contract as in smart contract blockchains, it is desired that concealment can be designed more flexibly. For example, in a case where a smart contract blockchain is applied to transactions of cargo insurance policies in trade business, it is desired that items to be concealed can be set flexibly among multiple items and that the disclosure range can be set to a combination of multiple different organizations such an insurance company, an advising bank, and an issuing bank. In this case, management information is complex such as which items are encrypted in the contract data having multiple items, to which users the information is disclosed, and which keys need to be used for the decryption. Further, key exchange procedures necessary for obtaining common keys and management of public keys and secret keys are complex, which imposes a heavy burden in operation on the users when they use the system.

To address these problems, it is conceivable to have a centralized concealment server outside the blockchain system as in non-patent document 2. The concealment server stores management information for concealment and provides functions of encryption and decryption in response to requests from the users. Concealed information is included into the contract data, which is stored in the distributed ledger in the blockchain system. The concealment server manages encryption items and disclosure ranges. This reduces the burden on the users. However, in non-patent document 2, the advantages of distributed authority, which is a feature of the blockchain system, are impaired. For example, it is difficult to prevent internal frauds such as a case where the administrator of the concealment server abuses his/her authority and peeks at confidential information stored by another company. In addition, in a case where the administrator of the concealment server stops the service, it is not easy to decrypt encrypted data registered in the distributed ledger only with the users' authority. In addition, since keys are exchanged outside the blockchain system, no evidence of who passed a key to whom remains, which can impair the reliability of transaction evidence.

An objective of the present invention made in light of these points is to provide a data registration method, data decryption method, data structure, computer, and program capable of managing data registered in a distributed ledger with part of the data flexibly concealed without a centralized concealment server and without bothering the users with complicated procedures or key management.

Means for Solving the Problem

To solve the above problems, a data registration method in a computer, according to the present embodiment, includes: generating a common key for encrypting and decrypting an item included in data that is registered in a distributed ledger; acquiring a public key for each account of a user having access authority to the item; encrypting the common key with the public key for each account; and registering the common key encrypted for each account in the distributed ledger via a transaction.

To solve the above problems, a data decryption method in a computer, according to the present embodiment, includes: acquiring data that is registered in a distributed ledger via a transaction and includes an encrypted item; acquiring concealment management information registered in the distributed ledger, via a transaction; acquiring the encrypted item and an encrypted common key for decrypting the encrypted item, from the concealment management information; decrypting the encrypted common key using a secret key corresponding to the common key; and decrypting the encrypted item using the decrypted common key.

To solve the above problems, a data structure for concealment management information, according to the present embodiment, includes: account information on a user having access authority to an encrypted item of data registered in a distributed ledger via a transaction; information indicating the encrypted item; information on a public key for encrypting a common key for decrypting the encrypted item; and the common key encrypted with the public key. The account information identifies which user the concealment management information corresponds to. The common key is decrypted using a secret key corresponding to the public key. The decrypted common key is used for decrypting the encrypted item.

To solve the above problems, a computer according to the present embodiment includes a processor that performs: generating a common key for encrypting and decrypting an item included in data that is registered in a distributed ledger; acquiring a public key for each account of a user having access authority to the item; encrypting the common key with the public key for each account; and registering the common key encrypted for each account in the distributed ledger via a transaction.

To solve the above problems, a program according to the present embodiment causes a computer to perform generating a common key for encrypting and decrypting an item included in data that is registered in a distributed ledger; acquiring a public key for each account of a user having access authority to the item; encrypting the common key with the public key for each account; and registering the common key encrypted for each account in the distributed ledger via a transaction.

Effect of the Invention

The data registration method, data decryption method, data structure, computer, and program according to the present invention makes it possible to manage data registered in distributed ledgers with part of the data flexibly concealed without a centralized concealment server and without bothering the users with complicated procedures or the key management.

BRIEF DESCRIPTION OF THE DRAWINGS

FIG. 2A is a diagram illustrating an example of contract data before encryption.

FIG. 2B is a diagram illustrating an example of the contract data after encryption.

FIG. 4 is a diagram illustrating concealment management information according to the present embodiment.

MODE FOR CARRYING OUT THE INVENTION

Figure 1:
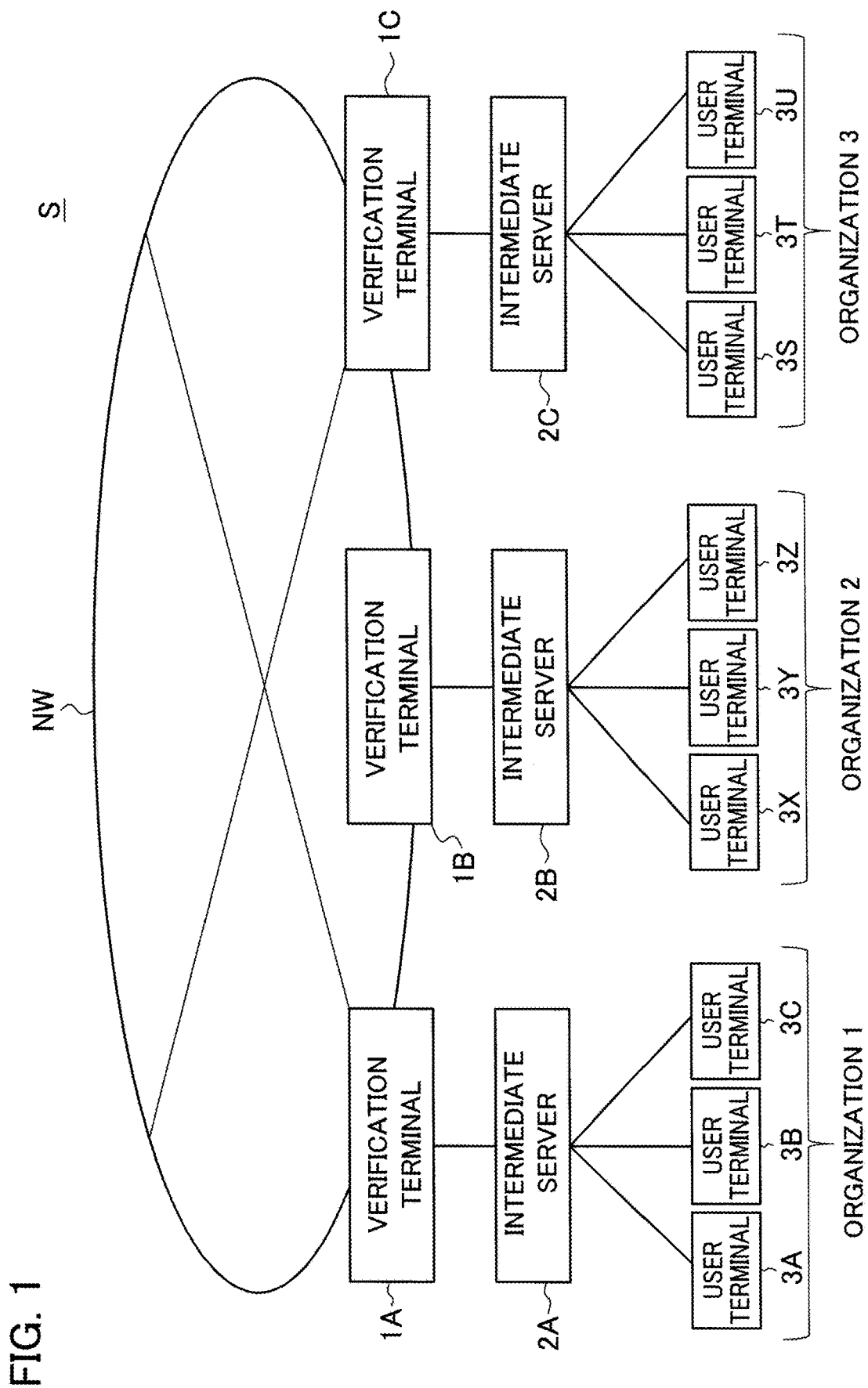
FIG. 1 is a functional block diagram illustrating a schematic configuration of a concealment system according to the present embodiment.

FIG. 1 is a functional block diagram illustrating a concealment system S of the present embodiment. The concealment system S of the present embodiment includes a network NW, verification terminals 1A, 1B, and 1C, intermediate servers 2A, 2B, and 2C, and user terminals 3A, 3B, 3C, 3X, 3Y, 3Z, 3S, 3T, and 3U. The network NW of the present embodiment is a blockchain network. The verification terminals 1A, 1B, and 1C of the present embodiment are blockchain verification terminals. The user terminals 3A, 3B, and 3C are used in organization 1, the user terminals 3X, 3Y, and 3Z are used in organization 2, and the user terminals 3S, 3T, and 3U are used in organization 3. Examples of the organizations include insurance companies and banks.

The user terminals 3A, 3B, and 3C are connected to the verification terminal 1A via the intermediate server 2A. The user terminals 3X, 3Y, and 3Z are connected to the verification terminal 1B via the intermediate server 2B. The user terminals 3S, 3T, and 3U are connected to the verification terminal 1C via the intermediate server 2C.

To avoid repetitive explanation, processes executed by the verification terminal 1A, the intermediate server 2A, and the user terminals 3A, 3B, and 3C will be mainly described in the following. The same description applies to the verification terminal 1B, the intermediate server 2B, and the user terminals 3X, 3Y, and 3Z and also applies to the verification terminal 1C, the intermediate server 2C, and the user terminals 3S, 3T, and 3U.

The verification terminal 1A has software with basic functions for using a blockchain system, such as verification and transfer of transactions and recording transactions into distributed ledgers 12A described later (see FIG. 3) and reference to them. The verification terminal 1A may utilize a general-purpose blockchain platform such as Ethereum or Hyperledger Fabric, instead of using dedicated software for using the concealment system S. The intermediate server 2A receives requests from each user terminal connected to the intermediate server 2A, communicates with the verification terminal 1A, and executes specified processes. Each intermediate server is operated separately at each organizational unit having different administrative authority. One intermediate server is assigned to one verification terminal. Multiple user terminals in the same organization may be connected to one intermediate server. An intermediate server connected to user terminals in an organization is not directly connected to user terminals in another organization. The verification terminal 1A and the intermediate server 2A does not necessarily need to be physically separated, but they may be in the same physical terminal by utilizing virtualization or other techniques.

The verification terminals 1A, 1B, and 1C are connected to one another via the network NW. In the example illustrated in FIG. 1, three verification terminals are connected to the network NW, but the number of verification terminals is not limited to this example. In addition, although in the example illustrated in FIG. 1, three user terminals are connected to each of the intermediate servers 2A, 2B, and 2C, the number of user terminals is not limited to this example. Although functions of the concealment system S of the present embodiment will be described in the following, it does not mean to exclude the other functions included in the concealment system S.

FIG. 2A illustrates an example of structured contract data used in the present embodiment. In contract data, as illustrated in FIG. 2A, date ("date"), description ("description"), contractors ("contractors"), the amount of money ("amount"), charge amount ("charges"), and other information are associated with contract ID ("contract1"). This contract data relates to a contract made between multiple people. The contract data is generated at a user terminal by user input. Part of the contract data is not disclosed to the entire concealment system S, but it is encrypted (concealed) by a method described later and recorded in distributed ledgers 12A. After execution of the encryption, as shown in areas R21 and R22 in FIG. 2B, some items ("contractors", "amount", and "charges") of the contract data are encrypted. Data registered in the distributed ledgers 12A is not limited to contract data, but any other kinds of data may be registered.

Keys for decryption are shared with only specified user terminals under the concealment system S. The intermediate servers perform decryption automatically. Hence, the user terminals do not display ciphertext as in FIG. 2B. Thus, the users do not directly see cyphertext as shown in FIG. 2B. The user terminals display cleartext as shown in FIG. 2A.

Figure 3:
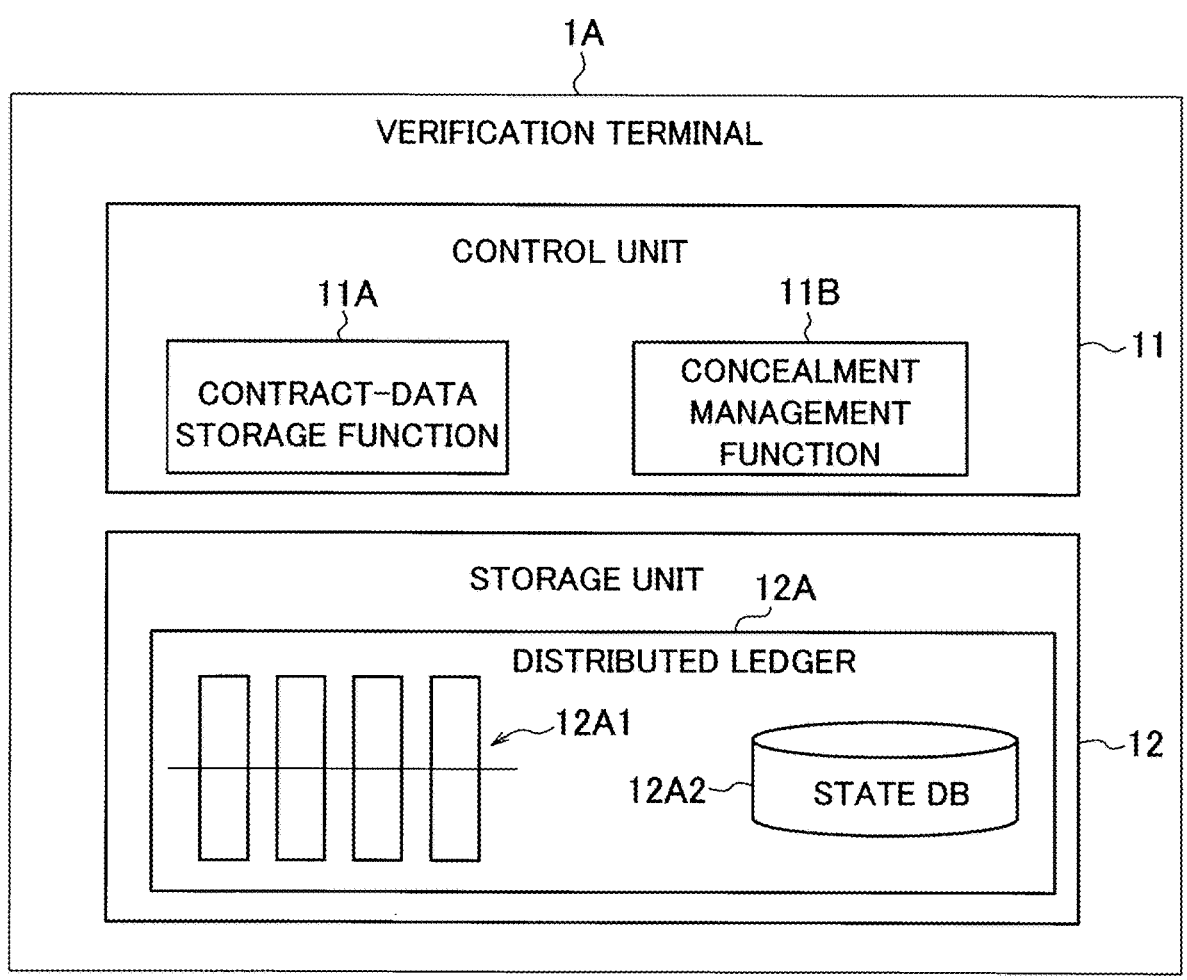
FIG. 3 is a functional block diagram of a verification terminal according to the present embodiment.

FIG. 3 is a functional block diagram of the verification terminal 1A. The verification terminal 1A includes a control unit 11 and a storage unit 12. The verification terminals 1B and 1C have the same or a similar hardware configuration as or to that of the verification terminal 1A, and hence, description thereof is omitted.

The control unit 11 includes one or more processors. The processors may include one or more memories that store a program for various processes and information during calculation. The memories include volatile memories and non-volatile memories. The memories include memories separate from the processors and the processors' built-in memories. The processors include general-purpose processors that read specific programs and execute specific functions and processors dedicated to specific processes. The dedicated processors include Application Specific Integrated Circuits (ASICs). The processors include Programmable Logic Devices (PLDs). The PLDs include Field-Programmable Gate Arrays (FPGAs). The control unit 11 may be a System on a Chip (SoC) or a System in a Package (SiP) in which one or more processors work cooperatively.

The control unit 11 has a contract-data storage function 11A and a concealment management function 11B. The contract-data storage function 11A and the concealment management function 11B are implemented using script code. The script code is stored in the storage unit 12. The script code refers to programs that are executable in distributed computing and called, for example, "chaincode" in Hyperledger Fabric and "contract" in Ethereum, which are smart contract blockchain platforms. Depending on the blockchain platform, script code is stored inside distributed ledgers 12A in some cases. Generally, in a smart contract blockchain system, this script code is executed according to a transaction issued by a user terminal, and a consensus is formed on the execution results with the verification terminal 1B or 1C in another organization. Key-value data which is the execution results and the consensus result are recorded in the distributed ledger 12A held in the verification terminal 1A.

The storage unit 12 is constructed semiconductor memory, magnetic memory, or the like. The storage unit 12 includes a DB for storing any information such as logs, programs, and contents. The storage unit 12 may function also as work memory. The distributed ledger 12A stored by the storage unit 12 has a state DB 12A2 inside, which stores data of key-value expression. A data store 12A1 in a form of a chain unique to blockchain stores snapshots (such as hash values) of the state DB 12A2, including execution results of the script code.

In the present embodiment, following the protocol of the blockchain being used, the verification terminal 1A executes the script code for the contract-data storage function 11A and the concealment management function 11B. The contract-data storage function 11A receives a transaction including contract data from the intermediate server 2A and records the transaction in the distributed ledger 12A, following the protocol of the blockchain. In the case where the contract data includes items to be encrypted, the items are encrypted (concealed) at the intermediate server 2A. Thus, the contract data received by the contract-data storage function 11A has encrypted parts as illustrated in FIG. 2B. Since ciphertext is handled as character strings, flags may be added that explicitly indicates that they are encrypted.

The concealment management function 11B receives a transaction including information necessary for concealment from the intermediate server 2A and registers the transaction in the distributed ledger 12A as concealment management information, following the protocol of the blockchain. The data structure of the concealment management information, as shown in FIG. 4 as an example, has information on a public key (see area R41) used for key exchange, information (see area R42) indicating which item of the contract data is encrypted, and information on common keys (which have already been encrypted using the public key) (see area R43) for the respective encryption items, those information pieces being associated with the account information of each user who has access authority to the encryption items. Here, the account means an ID for uniquely identifying a user. For example, in the example shown in FIG. 4, the account information of user A (userA) in organization 1 (org1) is indicated as "org1.userA", for example. The concealment management information may include identity information (see area R44) for identifying the account (for example, a certificate issued by a certificate authority (CA) or a hash for a public key for signature verification). By verifying an account against the identity information, the verification terminal 1A can verify whether a transaction has been issued by the account. Thus, the verification terminal 1A prevents an unauthorized user from making unauthorized writing in the concealment management information.

Figure 5:
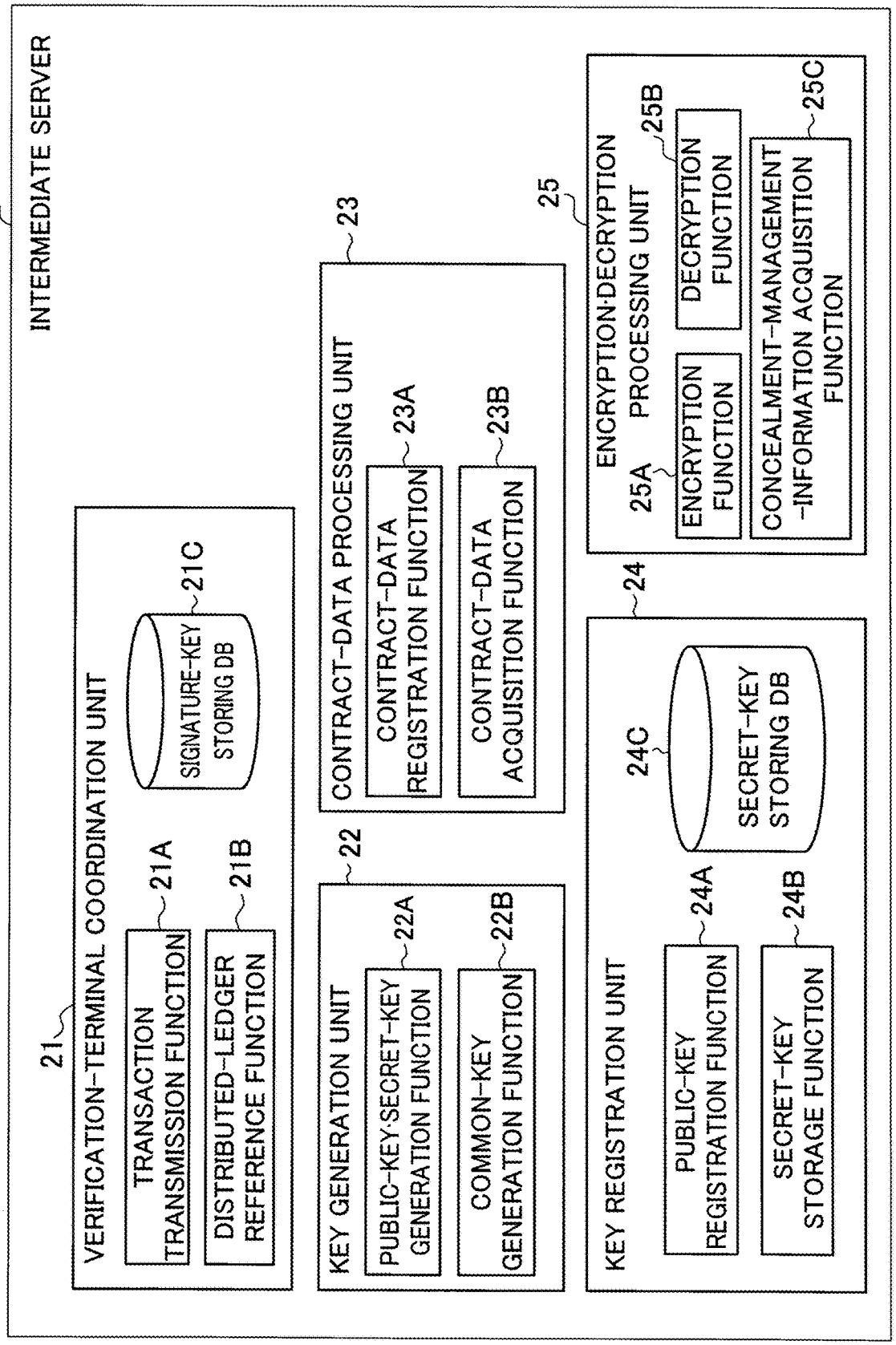
FIG. 5 is a functional block diagram of an intermediate server according to the present embodiment.

FIG. 5 is a functional block diagram of the intermediate server 2A. The intermediate servers 2B and 2C have the same or a similar hardware configuration as or to that of the intermediate server 2A, and hence, description thereof is omitted.

The intermediate server 2A includes a verification-terminal coordination unit 21, a key generation unit 22, a contract-data processing unit 23, a key registration unit 24, and an encryption•decryption processing unit 25. These functional units are executed by the processor of the intermediate server 2A.

The verification-terminal coordination unit 21 has a transaction transmission function 21A, a distributed-ledger reference function 21B, and a signature-key storing DB 21C. The transaction transmission function 21A receives information from each functional unit, generates a transaction necessary for recoding in the distributed ledger 12A, and transmits it to the verification terminal 1A. Generating a transaction in a blockchain system requires an electronic signature key associated with each account. The electronic signature keys are stored in the signature-key storing DB 21C. The distributed-ledger reference function 21B, having a function for referring to the distributed ledger 12A held by the verification terminal 1A, acquires contract data or concealment management information on the distributed ledger 12A in response to a request from each functional unit.

The key generation unit 22 has a public-key•secret-key generation function 22A and a common-key generation function 22B. The public-key•secret-key generation function 22A generates public keys and/or secret keys in response to requests from other functional units. The public-key•secret-key generation function 22A in the present embodiment generates a pair of public and secret keys for each user account. The public-key•secret-key generation function 22A is capable of updating pairs of public and secret keys regularly. At each update, the intermediate server 2A re-registers pairs of updated public and secret keys in the distributed ledger 12A as concealment management information. Pairs of public and secret keys are used for key exchange to share common keys. The public-key•secret-key generation function 22A uses, for example, an RSA public-key cryptosystem to generate public keys and secret keys. The public-key•secret-key generation function 22A passes generated key pairs to the key registration unit 24.

The common-key generation function 22B generates common keys to be used for encrypting or decrypting items of contract data at the encryption•decryption processing unit 25. the present embodiment utilizes a common-key cryptosystem, such as, for example, AES-GCM, as an example of encryption and decryption. Specifically, the present embodiment uses the same key for, both encryption and decryption. In the following, this key is referred to as the common key. The common-key generation function 22B in the present embodiment generates a common key for each item to be encrypted included in data. For example, in the case of setting item A to be accessible only from the user terminal 3A, the user terminal 3X, and the user terminal 3S, the common-key generation function 22B generates a common key for item A. Then, the common-key generation function 22B encrypts the common key with the public key of the user terminal 3A, encrypts the common key with the public key of the user terminal 3X, and encrypts the common key with the public key of the user terminal 3S. In this case, item A is the item associated with the common key. Although details will be described later, in the following embodiment 1, in the case of receiving a request for registering contract data in the state where a common key has been already distributed to a specified account, the common key is used. In contrast, in the following embodiment 2, a common key is newly generated at every reception of a request for registering contract data.

The contract-data processing unit 23 has a contract-data registration function 23A and a contract-data acquisition function 23B.

When some items of contract data are specified for encryption, the contract-data registration function 23A requests the encryption•decryption processing unit 25 to perform the encryption. After the encryption, the contract-data registration function 23A transmits the contract data to the verification-terminal coordination unit 21. The contract data is issued as a transaction via the verification-terminal coordination unit 21, and recorded in the distributed ledger 12A, following the process of the blockchain system. In other words, the contract-data registration function 23A registers the contract data in the distributed ledger 12A via the transaction.

When acquired contract data includes encrypted items, the contract-data acquisition function 23B requests the encryption•decryption processing unit 25 to perform the decryption. After the decryption is executed, the contract-data acquisition function 23B transmits the contract data to the requesting terminal.

The key registration unit 24 has a public-key registration function 24A, a secret-key storage function 24B, and a secret-key storing DB 24C. The public-key registration function 24A registers the public keys generated by the key generation unit 22 in the distributed ledger 12A via the verification terminal 1A. At this time, the public keys are registered via transactions. The secret-key storage function 24B registers the secret keys generated by the key generation unit 22 in the secret-key storing DB 24C inside the intermediate server 2A to prevent these secret keys from leaking outside.

The encryption•decryption processing unit 25 executes an encryption or decryption process on the items requested to be encrypted or decrypted, in response to a request from the contract-data processing unit 23 and transmits the resultant data to the contract-data processing unit 23. The encryption•decryption processing unit 25 has an encryption function 25A, a decryption function 25B, and a concealment-management-information acquisition function 25C which works in corporation with these two functions.

The encryption function 25A determines the account of a user terminal requesting encryption, receives contract data before encryption and concealment management information acquired by the concealment-management-information acquisition function 25C, encrypts requested items, and outputs the contract data including the encrypted items.

The decryption function 25B determines the account of a user terminal requesting decryption, receives contract data including encryption items and concealment management information acquired by the concealment-management-information acquisition function 25C, decrypts the encryption items, and outputs the decrypted contract data.

The concealment-management-information acquisition function 25C acquires concealment management information on a specified account from the verification terminal 1A via the verification-terminal coordination unit 21 and passes it to the encryption function 25A or the decryption function 25B.

Figure 6:
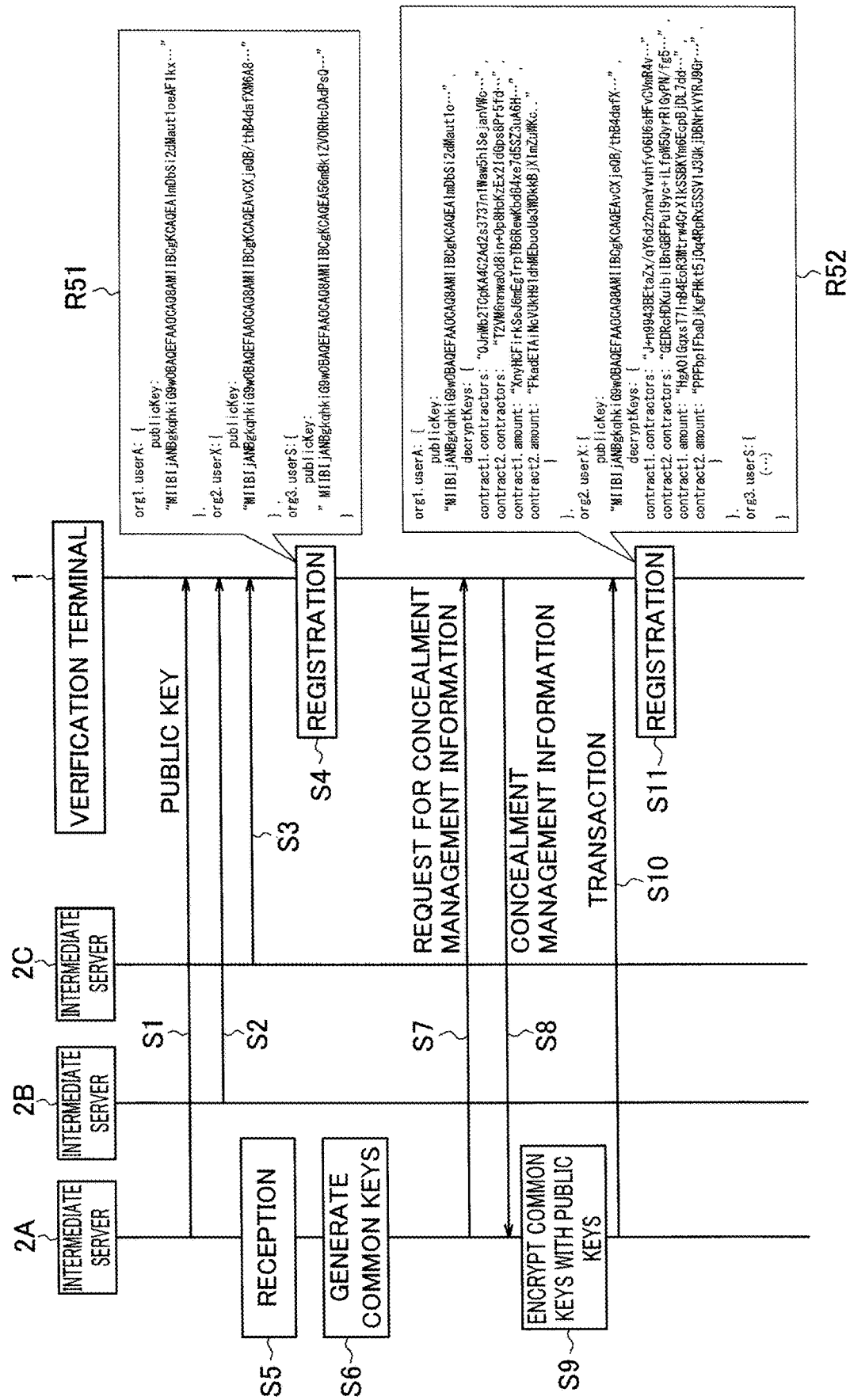
FIG. 6 is a sequence diagram illustrating a creation process of concealment management information according to the present embodiment.

FIG. 6 is a diagram illustrating a process of creating concealment management information, executed by the intermediate servers 2A, 2B, and 2C and the respective verification terminals 1A, 1B, and 1C. Although hereinafter the three verification terminals 1A, 1B, and 1C are collectively referred to as a verification terminal 1, a process from each intermediate server to a verification terminal is performed using the corresponding verification terminal. Here, description is made, as an example, of a case where the user terminal 3A specifies only the user terminals 3X and 3S as the destinations to which common keys are to be distributed and where the user terminal 3A sets the contractors ("contractors") and the amount of money ("amount") as the items to be encrypted.

The intermediate server 2A generates a public key and a secret key corresponding to the public key for each account of the user terminals 3A, 3B, and 3C, includes the generated public keys in a transaction through the verification-terminal coordination unit 21, and transmits the transaction to the verification terminal 1 (step S1). In the same way, the intermediate server 2B and the intermediate server 2C generate a public key and a secret key for each of the user terminals 3X, 3Y, and 3Z, and 3S, 3T, and 3U, include the generated public keys in a transaction through the verification-terminal coordination unit 21, and transmit the transaction to the verification terminal 1 (step S2 and step S3).

The verification terminal 1 consents to the received transaction including the public keys, following the protocol of the blockchain system and registers the public keys in the distributed ledger 12A as concealment management information via the concealment management function 11B (step S4). As shown in area R51, the distributed ledger 12A stores the account for each user and the public key with these associated with each other. The registration process described above can be executed, for example, when an account is created.

At a certain time, the intermediate server 2A receives the information indicating which items in the contract data transmitted from the user terminal 3A are to be encrypted with common keys (specifically, the items of the contractors "contractors" and the amount of money "amount" with respect to contract1 and contract2) and the information indicating to which accounts the common keys are to be distributed to disclose the information (specifically, the user terminal 3X "org2.userX" and the user terminal 3S "org3.userS") (step S5).

The intermediate server 2A generates a different common key for each item specified for encryption by the user terminal 3A (step S6). Specifically, the intermediate server 2A generates four different common keys for "contract1.contractors", "contract2. contractors", "contract1.amount", and "contract2.amount".

The intermediate server 2A acquires the public keys of the accounts to which the common keys are to be distributed, specified by the user terminal 3A, from the concealment management information on the distributed ledger via the verification terminal 1. Specifically, the intermediate server 2A requests the verification terminal 1 to send concealment management information including the public keys of the user terminal 3X and the user terminal 3S (step S7). The intermediate server 2A also acquires the public key of the user terminal 3A which is the requesting account. The verification terminal 1 acquires the requested concealment management information from the distributed ledger 12A and transmits it to the intermediate server 2A (step S8).

The intermediate server 2A encrypts each common key with each acquired public key. Specifically, for a common key, the intermediate server 2A generates the common key for the user terminal 3A that has been encrypted with the public key of the user terminal 3A, the common key for the user terminal 3B that has been encrypted with the public key of the user terminal 3X, and the common key for the user terminal 3B that has been encrypted with the public key of the user terminal 3S (step S9). The intermediate server 2A generates a transaction including "information indicating the encryption items" and "the common keys for the encryption items" for each of the accounts that are the distribution destinations of the encrypted common keys and transmits it to the verification terminal 1 (step S10). The verification terminal 1 consents to the received transaction, following the protocol of the blockchain system, and registers it in the distributed ledger 12A as concealment management information (step S11). As shown in area R52, information on the encrypted common keys is stored for the contractors ("contractors") and the amounts of money ("amount"). The intermediate server 2A creates concealment management information in this manner.

Figure 7:
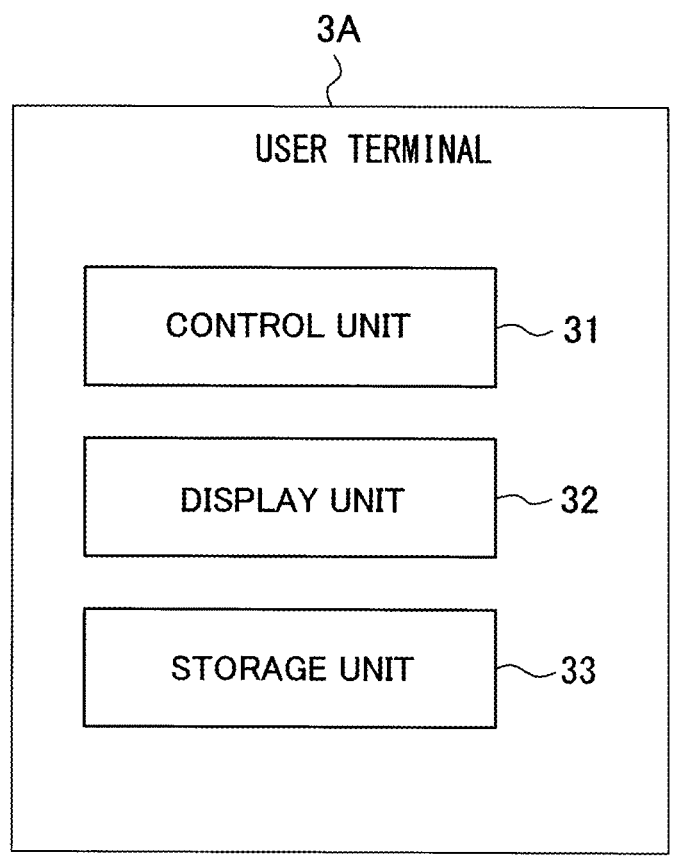
FIG. 7 is a functional block diagram of a user terminal according to the present embodiment.

FIG. 7 is a functional block diagram of the user terminal 3A. The user terminal 3A has a control unit 31, a display unit 32, and a storage unit 33. Other user terminals have the same hardware configuration as that of the user terminal 3A, and hence, description thereof is omitted.

The control unit 31 has one or multiple processors. The control unit 31 executes a program defining control procedure to control the functional units of the user terminal 3A.

The display unit 32 is, for example, a display device such as a liquid crystal display, an organic electroluminescence (EL) display, or an inorganic EL display, but the display unit 32 is not limited to those types. In the present embodiment, as an example, the display unit 32 is constructed a touch screen, which is capable of receiving selection operation made by the user's fingers or a stylus. Examples of the selection operation include pressing, touching, tapping, contacting, and nearing.

The storage unit 33 may be constructed semiconductor memory, magnetic memory, or the like. The storage unit 33 has a DB for storing any information such as logs, programs, and contents. The storage unit 33 may function also as work memory.

Exemplary embodiments for encryption and decryption according to operation policy will be described below.

Embodiment 1

In embodiment 1, contract data is encrypted and decrypted on the assumption that the common keys have been already distributed (registered in the distributed ledger 12A) to the specified accounts through the process in FIG. 6. In other words, in embodiment 1, the intermediate server 2A performs encryption and decryption using common keys that have been already distributed. In this case, in the case of receiving a request, in a state where contract data with some items already encrypted is stored on the distributed ledger 12A, for further encrypting the contract data from a user terminal, the contract data in the distributed ledger 12A is updated.

Figure 8A:
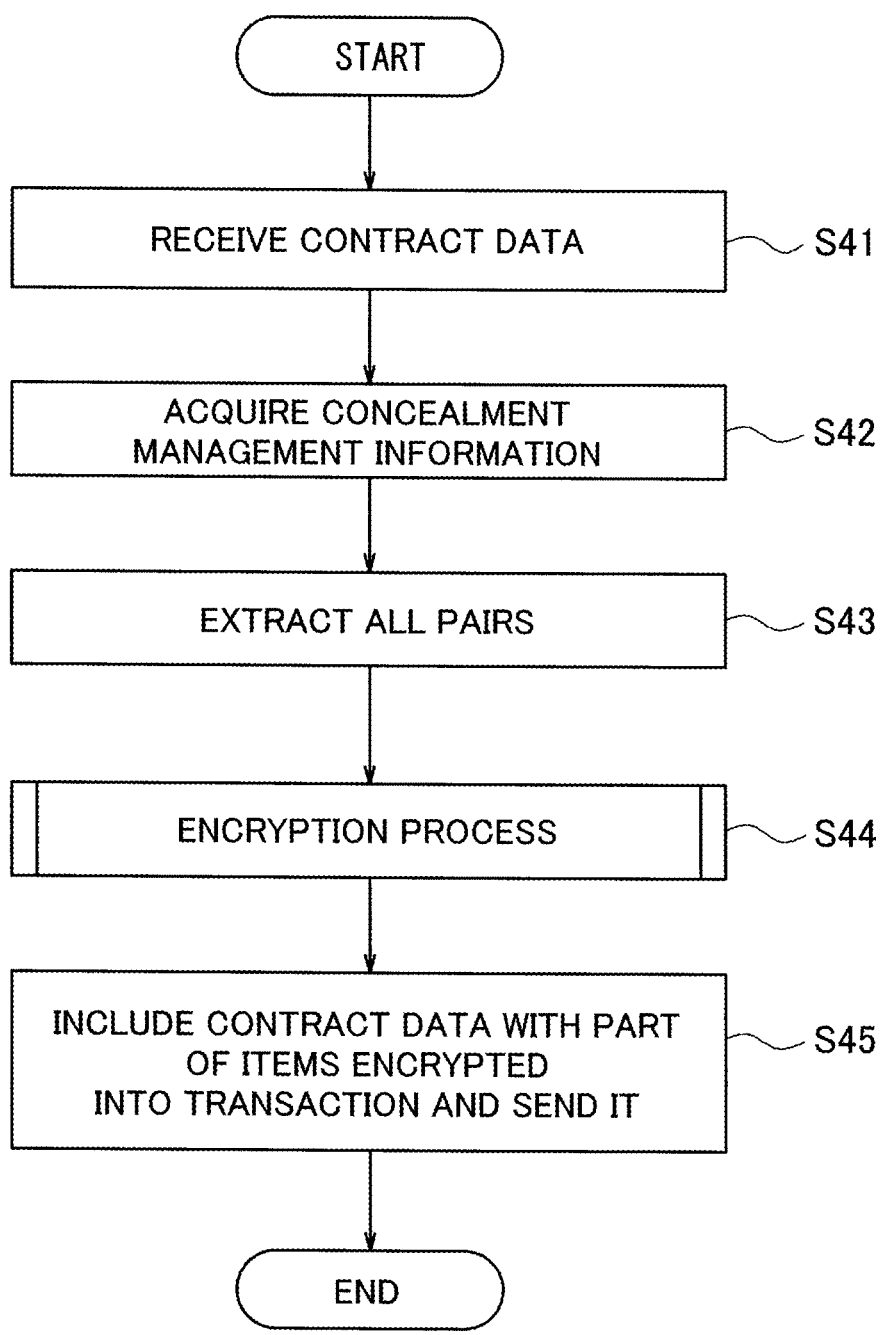
FIG. 8A is a flowchart illustrating a process that an intermediate server according to embodiment 1 executes.

FIG. 8A is a flowchart illustrating a method of encrypting data that the intermediate server 2A executes in response to a request from a user terminal. As illustrated in FIG. 8A, when the contract-data processing unit 23 receives contract data transmitted by the user terminal, the contract-data processing unit 23 requests the encryption•decryption processing unit 25 to encrypt the contract data (step S41).

When the encryption•decryption processing unit 25 receives the request for encrypting the contract data, the encryption function 25A determines the account of the user terminal requesting the encryption and acquires concealment management information on the account from the distributed ledger 12A through the concealment-management-information acquisition function 25C (step S42). The encryption function 25A extracts all the pairs of the items of the contract data having common keys (in other words, the items of the contract data that can be encrypted) and the encrypted common keys corresponding to these items, included in the concealment management information (step S43). Assuming that the items of the contract data that can be encrypted are, for example, the accounts for which org1.userA has requested encryption in area R52 in FIG. 6, they are contract1.contractors, contract2.contractors, contract1.amount, and contract2.amount. The encryption function 25A performs an encryption process using information on the items and the common keys, as illustrated in FIG. 8B (step S44).

Figure 8B:
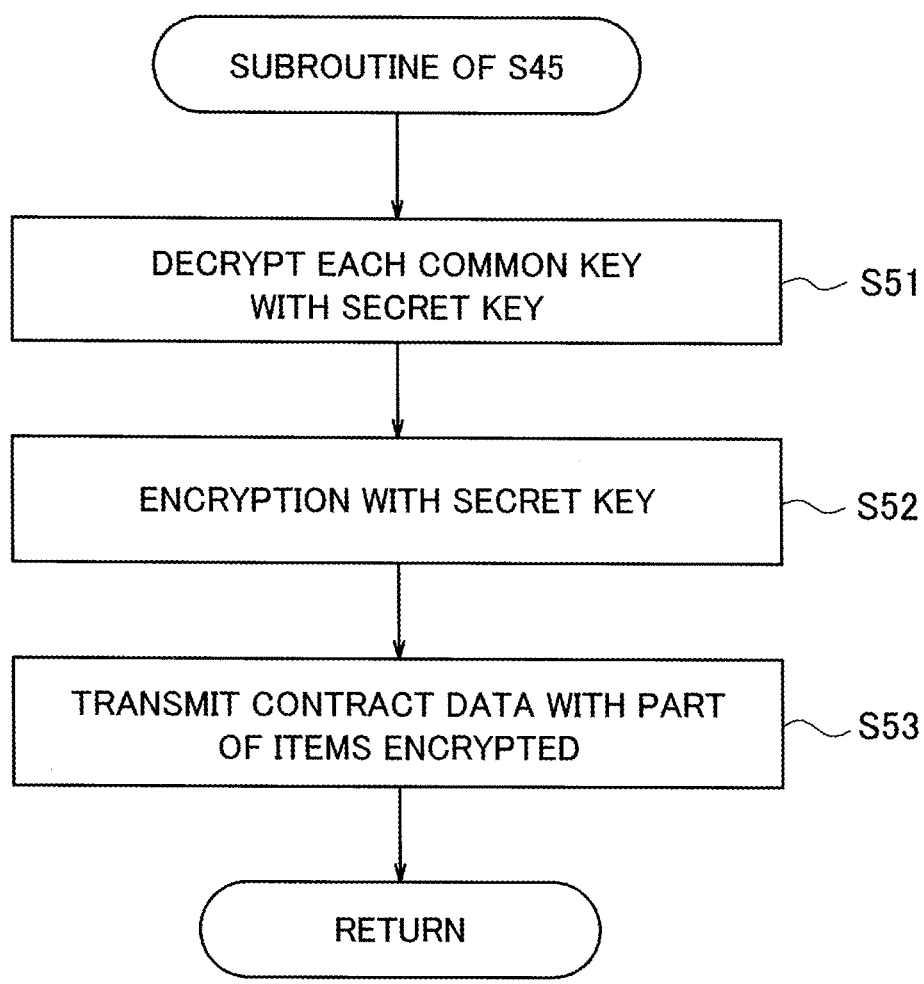
FIG. 8B is a flowchart illustrating a subroutine of an encryption process in FIG. 8A.

As illustrated in FIG. 8B, the encryption function 25A encrypts the items of the contract data that can be encrypted using the extracted common keys. Each common key has been encrypted. Hence, the encryption•decryption processing unit 25 decrypts each common key with the secret keys stored the secret-key storing DB 24C (step S51).

The encryption function 25A encrypts each item of the contract data that can be encrypted, using the corresponding decrypted common key (step S52). Through this process, the contract data with part of the items of the contract data encrypted is outputted. The encryption•decryption processing unit 25 transmits the contract data with part of the items encrypted to the contract-data processing unit 23 (step S53).

Returning to FIG. 8A, the contract-data processing unit 23 transmits the contract data with part of the items encrypted to the verification-terminal coordination unit 21, and the verification-terminal coordination unit 21 includes the contract data into a transaction and transmits the transaction to the verification terminal 1A (step S45). The verification terminal 1A consents to the transaction, following the protocol of the blockchain system and registers the contract data with part of the items encrypted in the distributed ledger.

Figure 9:
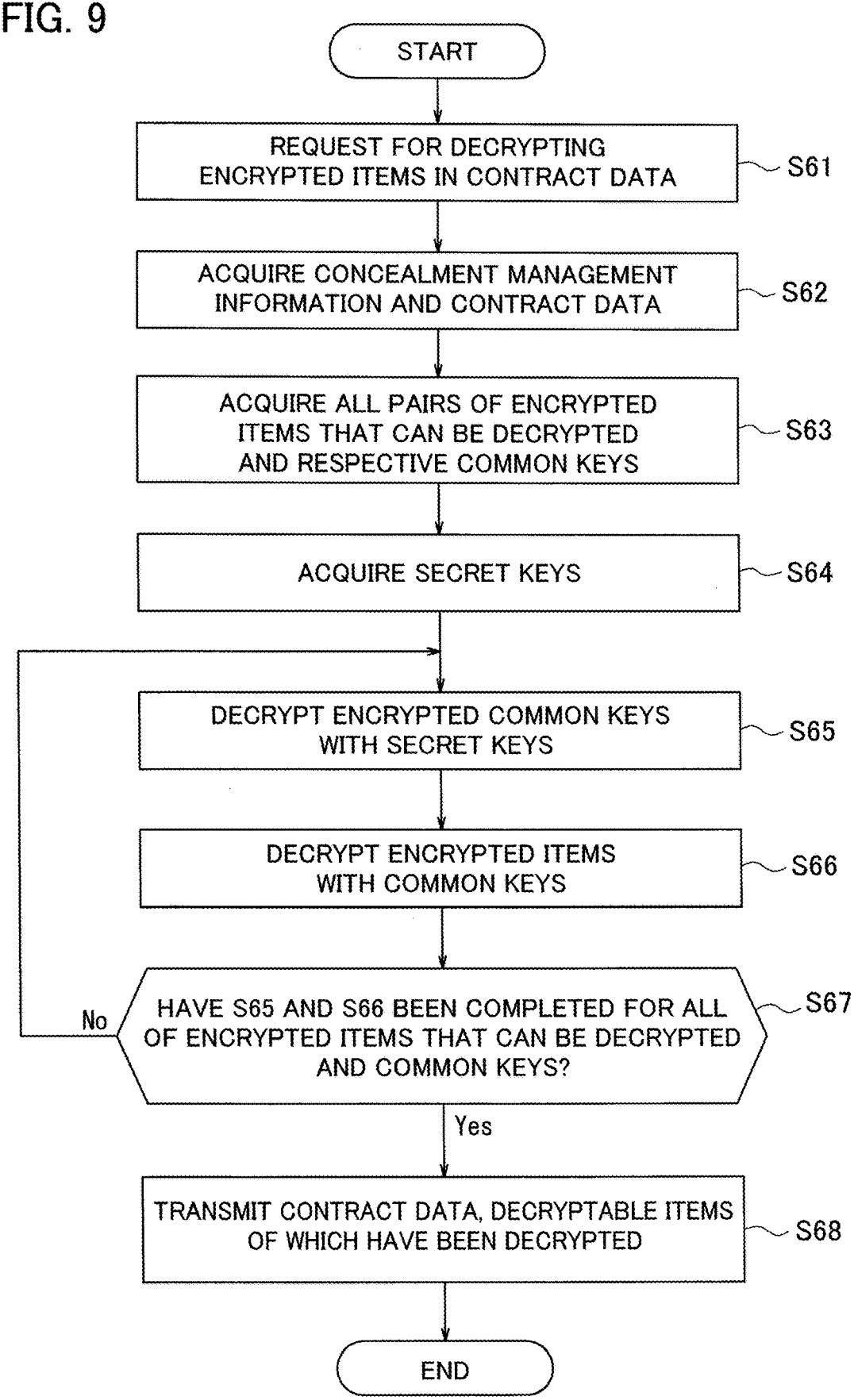
FIG. 9 is a flowchart illustrating a decryption process that an intermediate server executes.

FIG. 9 is a flowchart illustrating a method of decrypting data that the intermediate servers 2B and 2C execute. The details are as follows. Here, description will be made of a case of receiving a request for decryption from the user terminal 3X or the user terminal 3S which is permitted to decrypt the encryption items. Note that in the case where the encryption•decryption processing unit 25 receives a request for decryption from a user terminal for which the decryption is not permitted, the encryption•decryption processing unit 25 does not execute the following decryption process but returns a screen indicating an error or a screen with the encrypted items displayed as blank, to the user terminal.

The contract-data processing unit 23 receives a request for decrypting the encryption items of the contract data from a user terminal. Receiving the request for decryption, the contract-data processing unit 23 requests the encryption•decryption processing unit 25 to perform the decryption (step S61).

The concealment-management-information acquisition function 25C of the encryption•decryption processing unit 25 acquires the concealment management information and the contract data from the distributed ledger 12A (step S62).

The concealment-management-information acquisition function 25C acquires the list of all the pairs of the encryption items for which the common keys have been distributed and the respective common keys, for the account requesting the decryption (step S63). Here, the above common keys included in the concealment management information have been encrypted with the public key of the above account. Hence, the encryption•decryption processing unit 25 acquires the secret key for the above account from the secret-key storing DB 24C (step S64) and decrypts all the encrypted common keys with the secret key (step S65).

The encryption•decryption processing unit 25 decrypts all the encrypted items of the contract data including the encryption items, using all the above decrypted common keys (step S66). When the encryption•decryption processing unit 25 determines that steps S65 and S66 have been executed on all the encryption items that can be decrypted and the common keys (Yes step S67), the encryption•decryption processing unit 25 transmits the contract data with the encryption items decrypted to the contract-data processing unit 23 (step S68). Having acquired the contract data, the contract-data acquisition function 23B of the contract-data processing unit 23 transmits the contract data to the account requesting the decryption. Through this process, the display unit of the user terminal 3X or the user terminal 3S displays the decrypted contract data. Thus, the user can view the contract data.

The present embodiment allows contract data to be encrypted and decrypted using blockchain without using a centralized server. This makes it possible to encrypt and decrypt contract data while maintaining advantage of distributed authority.

In the present embodiment, a public key is generated for each account of a user having the access authority for an item to be encrypted. This allows the user himself/herself to specify encryption items of contract data and the disclosure range in a flexible manner. In other words, the users having no access authority cannot sneak a look at the data the viewing authority for which the user does not have.

In addition, since the concealment management information is managed on the distributed ledger 12A in the present embodiment, the complexity of concealment procedures or key management is reduced, which in turns reduces the operational cost and security risk.

In the present embodiment, the concealment management information is registered in the distributed ledger 12A via transactions. Concealment of contract data is performed by acquiring the concealment management information registered in the distributed ledger 12A. This improves the resistance to attack on the concealment management information.

In the present embodiment, a common key is generated for each item to be encrypted included in contract data. This makes it possible to specify which item to be encrypted in a flexible manner.

In the present embodiment, when common keys have been distributed (registered in the distributed ledger 12A) to the accounts of users having the access authority for items, the intermediate server 2A encrypts common keys and respective items, using the common keys that have been already distributed. Thus, when registering contract data, processes for registering new common keys are not necessary to encrypt the contract data, which reduces the processing load of the intermediate server 2A.

In the present embodiment, since keys are exchanged on the blockchain in the concealment system S, past key exchange histories, such as who has been permitted to view which item and to whom common keys have been distributed, are maintained as records. Further, tampering with keys is more difficult and the evidence is more convincing than in the case where keys are exchanged in an external server.

The above embodiment has been described as a typical example. However, it is apparent to those skilled in the art that many changes and substitutions are possible within the spirit and the scope of the present invention. Hence, it should not be understood that the present invention is limited by the above embodiment, but various modifications and changes are possible without departing from the range of the claims. For example, multiple configuration blocks depicted in a configuration diagram of the embodiment may be combined into one, or one configuration block may be divided into multiple ones.

Embodiment 2

In the above embodiment 1, the intermediate server 2A encrypts specified items using common keys in the concealment management information and register the contract data. In contrast, the intermediate server 2A in embodiment 2 always generates new common keys every time the intermediate server 2A receives a request for registering the contract data, and the intermediate server 2A encrypts specified items and registers the contract data. Details of embodiment 2 are as follows. The same description of embodiment 2 as that of embodiment 1 will be omitted.

When the contract-data processing unit 23 receives a request for registering contract data from a user terminal, the contract-data processing unit 23 specifies which item of the contract data is to be encrypted and to which account the common key is to be distributed. The information specified may be inputted through the user terminal 3A or may be set in advance in a setting file. In response to the request for registering the contract data, the key generation unit 22 generates new common keys. Note that these processes correspond to steps S5 and S6 in FIG. 6. It is assumed that the processes at steps S1 to S4 in FIG. 6 have been performed already.

The intermediate server 2A creates concealment management information by a method illustrated in FIG. 6. Specifically, the intermediate server 2A executes steps S7 to S11 illustrated in FIG. 6, but here description thereof is omitted because the description is the same.

The encryption function 25A acquires concealment management information from the distributed ledger 12A through the concealment-management-information acquisition function 25C. The encryption function 25A encrypts part of the item of the contract data, using the newly generated common keys included in the concealment management information. The contract-data processing unit 23 transmits the contract data with part of the items encrypted to the verification-terminal coordination unit 21, which includes the contract data in a transaction and transmits it to the verification terminal 1A.

Embodiment 3

In embodiment 3, when the intermediate server 2A registers the contract data with part of the items encrypted and the common keys, the intermediate server 2A may notify the user terminals to which the contract data is disclosed. In addition, when the user who has written in the contract data changes the common keys, the intermediate server 2A may communicate the change to the user terminals to which the contract data is disclosed.

In the case where the verification terminal, the intermediate server, or the user terminal is composed of a computer, these functions can be implemented by storing a program in which process details for implementing each function are described, in a storage unit inside or outside the computer and by a central processing unit (CPU) of the computer reading and executing the program. Such a program can be distributed by, for example, selling, giving, and renting portable recording media such as DVD and CD-ROM. Alternatively, such a program can be distributed by, for example, storing the program in a storage unit of a server on a network and transferring the program from the server to other computers via the network. Computers that execute such a program may, for example, temporarily store the program recorded on a portable recording medium or transferred from a server in its own storage unit. As another implementation aspect of this program, a computer may read the program directly from a portable recording medium and execute processes according to the program. Further, every time a program is transferred from a server to this computer, the computer may sequentially execute a process according to the received program.

EXPLANATION OF THE REFERENCE NUMERALS

S concealment system
1A, 1B, 1C verification terminal
control unit
11A contract-data storage function
11B concealment management function
12 storage unit
12A distributed ledger
12A1 data store
12A2 state DB
2A, 2B, 2C intermediate server
21 verification-terminal coordination unit
21A transaction transmission function
21B distributed-ledger reference function
21C signature-key storing DB
22 key generation unit
22A public-key•secret-key generation function
22B common-key generation function
23 contract-data processing unit
23A contract-data registration function
23B contract-data acquisition function
24 key registration unit
24A public-key registration function
24B secret-key storage function
24C secret-key storing DB
25 encryption•decryption processing unit
25A encryption function
25B decryption function
25C concealment-management-information acquisition function
3A, 3B, 3C, 3X, 3Y, 3Z, 3S, 3T, 3U user terminal
31 control unit
32 display unit
33 storage unit

The invention claimed is:

1. A data registration method performed by a computer, comprising:
receiving a request for registering data from a user terminal, wherein the data includes a plurality of items;

receiving information indicating one of the items of the data is to be encrypted;

generating a common key for encrypting and decrypting the item, wherein the common key is associated with the item;

acquiring a public key for each account of a user having access authority to the item;

encrypting the common key with the public key for each account;

registering the common key encrypted for each account in a distributed ledger;

encrypting the item using the common key;

registering the data in the distributed ledger with a single transaction, wherein the transaction includes the item encrypted with the common key, and the remaining items of the data unencrypted with the common key;

receiving additional information indicating an additional item of the data to be encrypted; and generating an additional common key for encrypting and decrypting the additional item, wherein the additional common key is associated with the additional item.

2. The data registration method according to claim 1, wherein the common key is generated in response to reception of the request for registering the data in the distributed ledger.

3. A data decryption method performed by a computer, comprising:

acquiring data that is registered in a distributed ledger via a single transaction, wherein the data includes a plurality of items, one of the items is an encrypted item encrypted with an associated common key, another one of the items is an additional encrypted item encrypted with an additional associated common key, and the remaining items are unencrypted with the associated common key or the additional associated common key;

acquiring concealment management information registered in the distributed ledger, wherein the concealment management information includes the associated common key encrypted with a public key for a user having access authority;

decrypting the encrypted associated common key using a secret key corresponding to an account of the user having access authority to obtain a decrypted associated common key;

decrypting the encrypted item using the decrypted associated common key;

decrypting the additional encrypted item using a decrypted additional associated common key; and providing the data to the account of the user, wherein the data includes the decrypted item, the decrypted additional item, and the remaining items.

4. A non-transitory computer readable medium, storing a program that causes a computer to execute a process, comprising:

registering account information for a user having access authority to an encrypted item of data registered in a distributed ledger, wherein the account information includes a public key for the user;

receiving a request for registering data from a user terminal, wherein the data includes a plurality of items of data;

receiving information indicating one of the items of data is the encrypted item;

receiving information on the public key for the user having access authority;

encrypting an associated common key for the item with the public key for the user having access authority;

registering the data in the distributed ledger with a single transaction, wherein the transaction includes the encrypted item encrypted with the associated common key and the remaining items of the data unencrypted with the associated common key;

receiving additional information indicating an additional item of the data to be encrypted; and generating an additional common key for encrypting and decrypting the additional item, wherein the additional common key is associated with the additional item, wherein the associated common key and the additional common key are decrypted using a secret key corresponding to the public key for the user having access authority, the decrypted associated common key is used for decrypting the encrypted item, and the decrypted additional common key is used for decrypting the additional encrypted item.

5. A computer, comprising:

at least one memory; and a processor, wherein the processor is configured to access the at least one memory and to execute functions that perform:

receiving a request for registering data from a user terminal, wherein the data includes a plurality of items;

receiving information indicating one of the items of the data is to be encrypted;

generating a common key for encrypting and decrypting the item, wherein the common key is associated with the item;

acquiring a public key for each account of a user having access authority to the item;

encrypting the common key with the public key for each account;

registering the common key encrypted for each account in a distributed ledger;

encrypting the item using the common key;

registering the data in the distributed ledger with a single transaction, wherein the transaction includes the item encrypted with the common key and the remaining items of the data unencrypted with the common key;

receiving additional information indicating an additional item of the data is to be encrypted; and generating an additional common key for encrypting and decrypting the additional item, wherein the additional common key is associated with the additional item.

6. A non-transitory computer readable storage medium storing a program that causes a computer to execute a process comprising:

receiving a request for registering data from a user terminal, wherein the data includes a plurality of items;

receiving information indicating one of the items of the data is to be encrypted;

generating a common key for encrypting and decrypting the item, wherein the common key is associated with the item;

acquiring a public key for each account of a user having access authority to the item;

encrypting the common key with the public key for each account;

registering the common key encrypted for each account in a distributed ledger;

encrypting the item using the common key;
registering the data in the distributed ledger with a single transaction, wherein the transaction includes the item encrypted with the common key and the remaining items of the data unencrypted with the common key;
receiving additional information indicating an additional item of the data is to be encrypted; and
generating an additional common key for encrypting and decrypting the additional item, wherein the additional common key is associated with the additional item.

* * * * *